(12) United States Patent
Funakoshi et al.

(10) Patent No.: US 11,002,905 B2
(45) Date of Patent: May 11, 2021

(54) METHOD FOR PRODUCING OPTICAL FIBER PREFORM

(71) Applicant: SUMITOMO ELECTRIC INDUSTRIES, LTD., Osaka (JP)

(72) Inventors: Akiko Funakoshi, Yokohama (JP); Satoshi Tanaka, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 148 days.

(21) Appl. No.: 16/473,648

(22) PCT Filed: Dec. 11, 2017

(86) PCT No.: PCT/JP2017/044377
§ 371 (c)(1),
(2) Date: Jun. 26, 2019

(87) PCT Pub. No.: WO2018/123541
PCT Pub. Date: Jul. 5, 2018

(65) Prior Publication Data
US 2021/0088715 A1    Mar. 25, 2021

(30) Foreign Application Priority Data
Dec. 28, 2016 (JP) .............................. JP2016-255812

(51) Int. Cl.
*G02B 6/02* (2006.01)
*C03B 37/012* (2006.01)

(52) U.S. Cl.
CPC .......... *G02B 6/02* (2013.01); *C03B 37/01211* (2013.01)

(58) Field of Classification Search
CPC ............................ G02B 6/02; C03B 37/01211
See application file for complete search history.

(56) References Cited

U.S. PATENT DOCUMENTS

| 4,693,738 A * | 9/1987 | Hoshikawa ......... C03B 37/0146 65/397 |
| 10,730,784 B2 * | 8/2020 | Milicevic .......... C03B 37/01861 |
| 2004/0159124 A1 | 8/2004 | Atkins et al. |
| 2017/0101334 A1 * | 4/2017 | Haruna ............. C03B 37/01211 |
| 2019/0270662 A1 * | 9/2019 | Haruna ............. C03B 37/01869 |

FOREIGN PATENT DOCUMENTS

| JP | 2003-335539 A | 11/2003 |
| JP | 2012-162409 A | 8/2012 |
| WO | WO-2008/001673 A1 | 1/2008 |
| WO | WO-2016/021576 A1 | 2/2016 |

* cited by examiner

*Primary Examiner* — Daniel Petkovsek
(74) *Attorney, Agent, or Firm* — Faegre Drinker Biddle & Reath LLP

(57) ABSTRACT

The present embodiment relates to an optical fiber preform producing method for effectively suppressing breaking of symmetry of refractive index profile defined on a cross section of an optical fiber preform. In the present embodiment, when producing a center glass rod forming a part of the optical fiber preform, prior to grinding an outer peripheral portion of an intermediate glass rod in which an element-doped region is formed by collapse, an non-defective article determination regarding the intermediate glass rod to be a grinding target is performed.

3 Claims, 10 Drawing Sheets

| STEP NUMBER | STATE OF PREFORM |
|---|---|
| ST10 |  |
| ST20 |  |
| ST30 |  |
| ST50 |  |
| ST410 |  |

Fig.10

| STEP NUMBER | STATE OF PREFORM |
|---|---|
| ST60 | 10, 61, S4 |
| ST72 | S5, 71, 10, COMBUSTION GAS, RAW MATERIAL GAS |
| ST73 | S5, 10, 71, COMBUSTION GAS, RAW MATERIAL GAS |

METHOD FOR PRODUCING OPTICAL FIBER PREFORM

TECHNICAL FIELD

The present invention relates to an optical fiber preform producing method.

BACKGROUND ART

Various techniques regarding optical fiber preform producing techniques have been currently known. For example, Patent Document 1 discloses a producing method of an optical fiber in which Al is doped to a core. In particular, in Patent Document 1, as a producing method of a center glass rod forming a part of an optical fiber preform, an example is disclosed in which deposition of a glass particulate deposit including Al (glass layer) in a glass pipe (hollow glass rod), transparentization of the glass layer, and solidification of a hollow portion of the glass pipe are sequentially performed.

In addition, in Patent Document 2, as a producing method of the center glass rod forming a part of the optical fiber preform, an example is disclosed in which production of a glass rod to which an alkali metal element is doped, deposition of a glass layer on an outer periphery of the glass rod, diffusion of an alkali metal element to the glass layer by thermal processing, removal of holes in the glass rod to which alkali metal is doped, and solidification (collapse) of the glass layer in which alkali metal is diffused are sequentially performed.

Furthermore, in Patent Document 3, as one step of the producing method of an optical fiber preform, an example is disclosed in which a hollow of the glass pipe is solidified by heating the glass pipe formed of quartz glass in which an alkali metal element is doped to an inner surface.

CITATION LIST

Patent Literature

Patent Document 1: International Publication WO 2008/001673
Patent Document 2: International Publication WO 2016/021576
Patent Document 3: Japanese Patent Application Laid-Open No. 2012-162409

SUMMARY OF INVENTION

Technical Problem

As a result of examining the conventional producing method of an optical fiber preform, the inventor has found the following problems.

That is, a cross section of an element-doped region in the obtained glass rod (surface perpendicular to longitudinal direction of glass rod) may have a non-circular shape (for example, elliptical shape) due to the collapse of the glass pipe in which the glass layer to which the element is doped is formed. However, even when a size of the element-doped region, a concentration distribution of the element, and the like are examined, there has been a problem in that the size of the element-doped region and the concentration distribution of the element cannot be visually recognized.

Furthermore, even in a case where the concentration distribution of the doped element is measured, and if a non-defective article of the glass rod in which the element-doped region is formed by the collapse is determined by using the measurement result based on arbitrary one-dimensional information, there is a case where optical characteristics of an optical fiber obtained by drawing the optical fiber preform that has been finally produced is largely different from a designed value. It is considered that this is because symmetry of refractive index profile around the center axis is significantly impaired along with an increase in noncircularity of an outer peripheral shape of the element-doped region including the center axis in a cross section perpendicular to the center axis of the optical fiber preform. A mix of defective glass rods and non-defective glass rods causes deterioration in producing yield of the optical fiber that is a final product.

The present invention has been made to solve the above problems, and an object of the present invention is to provide an optical fiber preform producing method for effectively suppressing breaking of symmetry of refractive index profile defined on a cross section of the optical fiber preform.

Solution to Problem

To achieve above object, the optical fiber preform producing method, according to the present embodiment, produces an optical fiber preform which has a center glass rod extending along a predetermined center axis and a peripheral glass portion provided on an outer peripheral surface of the center glass rod. In particular, in the present embodiment, a producing step of the center glass rod includes a glass layer forming step, a collapsing step, an inspection step, and a grinding step. In the glass layer forming step, by forming a glass layer including a predetermined element on an inner peripheral surface of a hollow glass rod (glass pipe) extending along the center axis, a first intermediate glass rod is produced. In the collapsing step, by collapsing the first intermediate glass rod, a second intermediate glass rod is produced in which an element-doped region including the predetermined element is formed along the center axis. In the inspection step, by using a measurement result of the concentration distribution measured on a cross section of the second intermediate glass rod perpendicular to the center axis that is concentration distribution of a predetermined element along the long axis direction of the element-doped region, a non-defective article of the second intermediate glass rod is selected. In the grinding step, the center glass rod is produced by grinding an outer peripheral portion surrounding the center axis of the second intermediate glass rod selected in the inspection step along a grinding planned line defined by a predetermined radius around the center axis.

Here, the inspection step includes an inspection first step to an inspection fourth step. In the inspection first step, a measurement surface corresponding to the cross section of the second intermediate glass rod is formed with respect to the second intermediate glass rod. In the inspection second step, a long axis direction of the element-doped region on the formed measurement surface is specified. In the inspection third step, concentration distribution of the predetermined element in the element-doped region along the specified long axis direction is measured. In the inspection fourth step, by using distance information between the grinding planned line and the element-doped region calculated from the measurement result of the concentration distribution of the predetermined element along the long axis direction of the element-doped region, the second intermediate glass rod that can be a grinding target in the grinding step is selected as a non-defective article.

Herein, the "long axis direction of the element-doped region" means a direction defined by one of a plurality of straight lines intersecting with the center axis on the cross section of the intermediate glass rod in which the element-doped region is formed along the center axis (rod cross section or measurement surface defined by plane perpendicular to center axis) that is a straight line giving the maximum width of widths of the element-doped region along each of the plurality of straight lines.

Advantageous Effects of Invention

According to the present embodiment, breaking of symmetry of refractive index profile defined on a cross section of an optical fiber preform may be effectively suppressed.

BRIEF DESCRIPTION OF DRAWINGS

FIG. 10 is a diagram for comparing states of the preform in steps ST60, ST72, and ST73 in order to explain the state change of the preform between the steps.

DESCRIPTION OF EMBODIMENTS

Description of Embodiment of Present Invention

Figure 1:
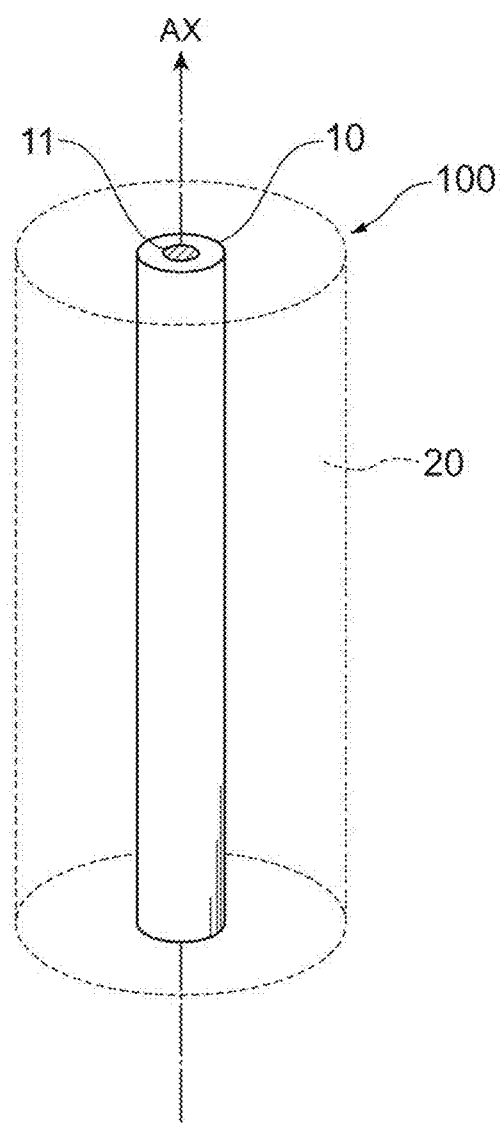
FIG. 1 is a diagram of an example of an optical fiber preform 100 produced by an optical fiber preform producing method according to the present embodiment.

First, contents of an embodiment of the present invention will be individually listed and described.

(1) An optical fiber preform producing method, according to the present embodiment, produces an optical fiber preform which has a center glass rod extending along a predetermined center axis and a peripheral glass portion provided on an outer peripheral surface of the center glass rod. In particular, as one aspect of the present embodiment, a producing step of the center glass rod includes a glass layer forming step, a collapsing step, an inspection step, and a grinding step. In the glass layer forming step, by forming a glass layer including a predetermined element on an inner peripheral surface of a hollow glass rod extending along the center axis, a first intermediate glass rod is produced. In the collapsing step, by collapsing the first intermediate glass rod, a second intermediate glass rod is produced in which an element-doped region including the predetermined element is formed along the center axis. In the inspection step, by using a measurement result of the concentration distribution measured on a cross section of the second intermediate glass rod perpendicular to the center axis that is concentration distribution of a predetermined element along the long axis direction of the element-doped region, a non-defective article of the second intermediate glass rod is selected. In the grinding step, the center glass rod is produced by grinding an outer peripheral portion surrounding the center axis of the second intermediate glass rod selected in the inspection step along a grinding planned line defined by a predetermined radius around the center axis.

Furthermore, the inspection step includes an inspection first step to an inspection fourth step. In the inspection first step, a measurement surface corresponding to the cross section of the second intermediate glass rod is formed with respect to the second intermediate glass rod. In the inspection second step, a long axis direction of the element-doped region on the formed measurement surface is specified. In the inspection third step, concentration distribution of the predetermined element in the element-doped region along the specified long axis direction is measured. In the inspection fourth step, by using distance information between a grinding planned line and the element-doped region calculated from the measurement result of the concentration distribution of the predetermined element along the long axis direction of the element-doped region, the second intermediate glass rod that can be a grinding target in the grinding step is selected as a non-defective article.

(2) As one aspect of the present embodiment, the inspection second step may include a concentration measuring step, a shape approximation step, and an axis specifying step. In the concentration measuring step, the concentration distribution of the predetermined element is measured along each of a plurality of straight lines passing through a position intersecting with the center axis on the measurement surface. In the shape approximation step, an outer peripheral shape of the element-doped region on the measurement surface is approximated by elliptic fitting using information regarding the concentration distribution of the predetermined element along each of the plurality of straight lines, obtained by the concentration measuring step. In the axis specifying step, the long axis direction of the element-doped region is estimated from a long axis direction of the outer peripheral shape obtained by the shape approximation step. In the cross section of the second intermediate glass rod, the outer peripheral shape of the element-doped region deformed by the collapse often has an elliptical shape. Therefore, in such a case, the elliptic fitting is effective.

(3) As one aspect of the present embodiment, the inspection second step may include the axis specifying step for specifying the long axis direction of the outer peripheral shape on the measurement surface as the long axis direction of the element-doped region. In the cross section of the second intermediate glass rod, the outer peripheral shape of the second intermediate glass rod of which the outer peripheral shape of the element-doped region is deformed by the collapse is often deformed, and in this case, an angle formed by the long axis direction of the element-doped region and the long axis direction of the second intermediate glass rod tends to be small. Therefore, in the cross section of the second intermediate glass rod, the long axis direction of the element-doped region can be estimated from the long axis direction of the second intermediate glass rod.

As described above, each aspect listed in the description of the embodiment of the present invention can be applied to all the remaining aspects or all the combinations of the remaining aspects.

Details of Embodiment of Present Invention

A specific example of the optical fiber preform producing method according to the present invention will be described below in detail with reference to the accompanying drawings. The present invention is not limited to these examples. It is intended that the present invention includes all the changes within an equivalent meaning and range to the claims indicated in claims. Furthermore, in the description on the drawings, the same element is denoted with the same reference numeral, and an overlapped description will be omitted.

FIG. 1 is a diagram of an example of an optical fiber preform 100 produced by the optical fiber preform producing method according to the present embodiment. As illustrated in FIG. 1, the optical fiber preform 100 includes a center glass rod 10 extending along a center axis. AX and a peripheral glass portion (preform outer peripheral portion) 20 provided on an outer peripheral surface of the center glass rod 10. In the center glass rod 10, an element-doped region 11 to which a predetermined element is doped along the center axis AX is formed. The center glass rod 10 may be any one of a portion corresponding to a core of an optical fiber obtained by drawing the optical fiber preform 100 or a portion corresponding to a center region of the core (including center axis of optical fiber). The peripheral glass portion 20 may be any one of a portion corresponding to a cladding of the optical fiber obtained by drawing the optical fiber preform 100 or a portion of which an inner region corresponds to the outer peripheral portion of the core and an outer region corresponds to the cladding. In addition, the peripheral glass portion 20 may be configured by a plurality of glass regions, provided so as to surround the center glass rod 10, having refractive indices different from each other. Another hollow glass rod (glass pipe) 61 corresponding to a part of the core of the drawn optical fiber may be inserted between the center glass rod 10 and the peripheral glass portion 20 (refer to column having step number ST60 in FIG. 10).

Figure 2:
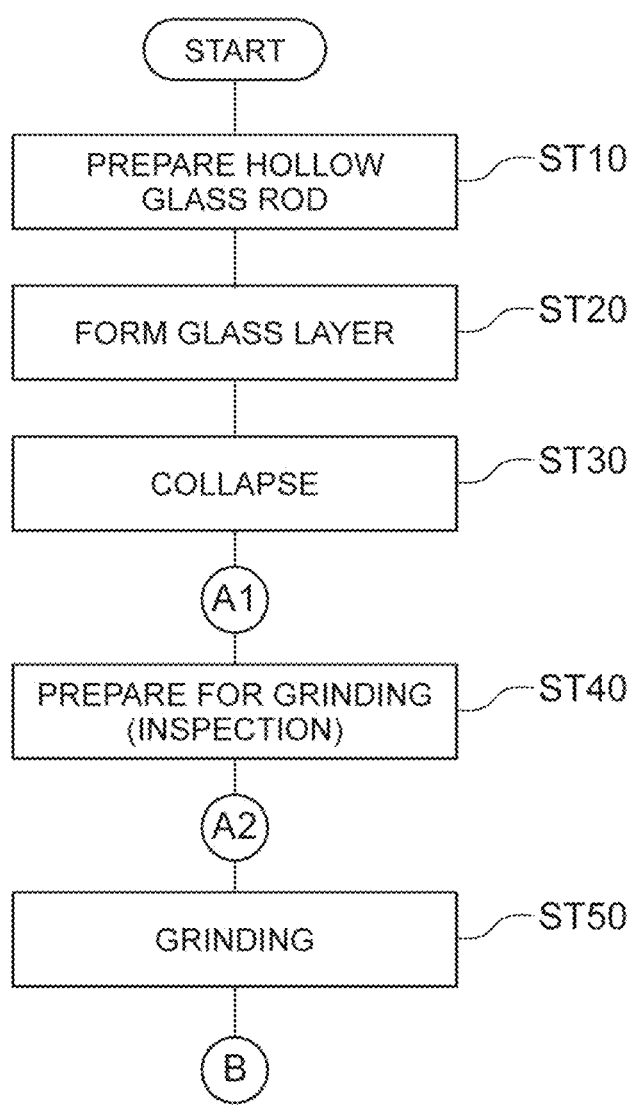
FIG. 2 is a flowchart for explaining a producing step of a center glass rod 10 in the optical fiber preform producing method according to the present embodiment.
Figure 3:
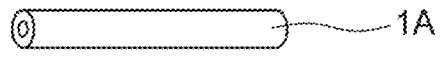
FIG. 3 is a diagram for comparing states of a preform in steps ST10, ST20, ST30, ST50, and ST410 in order to explain a state change of the preform between steps.
Figure 3:
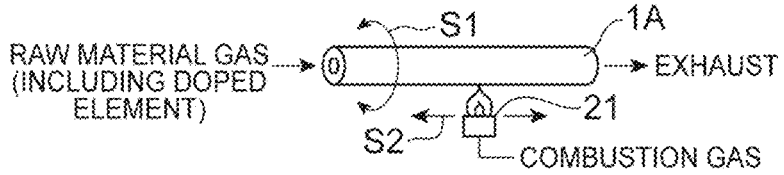
Figure 3:
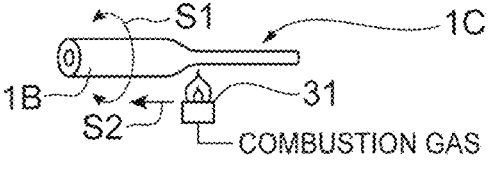
Figure 3:
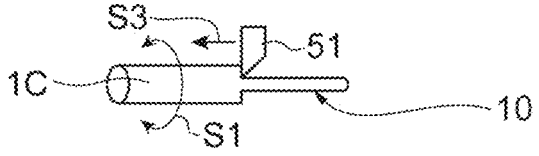
Figure 3:
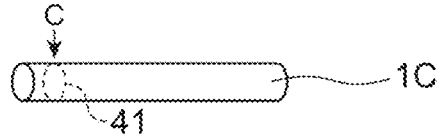

Hereinafter, the optical fiber preform producing method according to the present embodiment will be described with reference to FIGS. 2 to 10. FIG. 2 is a flowchart for explaining a producing step of the center glass rod 10 in the optical fiber preform producing method according to the present embodiment. FIG. 3 is a diagram of states of the preform in steps ST10, ST20, ST30, and ST50 illustrated in flowchart in FIG. 2 in order to explain a state change of the preforms between the steps as comparing the states with each other. In FIG. 3, the state of the preform in step ST410 illustrated in the flowchart in FIG. 6 is illustrated for comparison.

As illustrated in FIG. 2, in the present embodiment, first, a hollow glass rod (glass pipe) 1A is prepared (step ST10). As illustrated in FIG. 3 (column having step number ST10), the hollow glass rod 1A prepared in step ST10 is a glass pipe in which a hollow is provided along a longitudinal direction (direction coincident with center axis AX illustrated in FIG. 1, and it is assumed that longitudinal directions of various glass rods coincide with center axis AX in the following description). Subsequently, a glass layer including a predetermined element is formed on an inner peripheral surface of the hollow glass rod 1A by a glass layer forming step (step ST20). In the glass layer forming step (step ST20), as illustrated in FIG. 3 (column having step number ST20), while the hollow glass rod 1A is rotated (may be rotation in one direction) in a direction indicated by an arrow S1 around the longitudinal direction coincident with the center axis AX, an oxyhydrogen burner 21 to which combustion gas is supplied is moved in a direction indicated by an arrow S2 while heating the hollow glass rod 1A. Raw material gas including an element to be doped in the hollow of the hollow glass rod 1A is supplied from one end of the heated hollow glass rod 1A so as to form a glass layer to be the element-doped region 11 on the inner peripheral surface of the hollow glass rod 1A. The raw material gas introduced from one end of the hollow glass rod 1A into the hollow is exhausted from the other end of the hollow glass rod 1A. A first intermediate glass rod 1B is obtained through the glass layer forming step (step ST20).

In addition, the hollow of the first intermediate glass rod 1B produced as described above is collapsed (solidified) by the collapsing step (step ST30). In the collapsing step (step ST30), as illustrated in FIG. 3 (column having step number ST30), while the first intermediate glass rod 1B is rotated (may be rotation in one direction) in the direction indicated by the arrow S1 around the longitudinal direction coincident with the center axis AX, an oxyhydrogen burner 31 to which combustion gas is supplied is moved in the direction indicated by the arrow S2 while heating the first intermediate glass rod 1B. The hollow of the first intermediate glass rod 1B is collapsed by this heating, a second intermediate glass rod 1C in which the element-doped region 11 is formed along the longitudinal direction is obtained.

Figure 4:
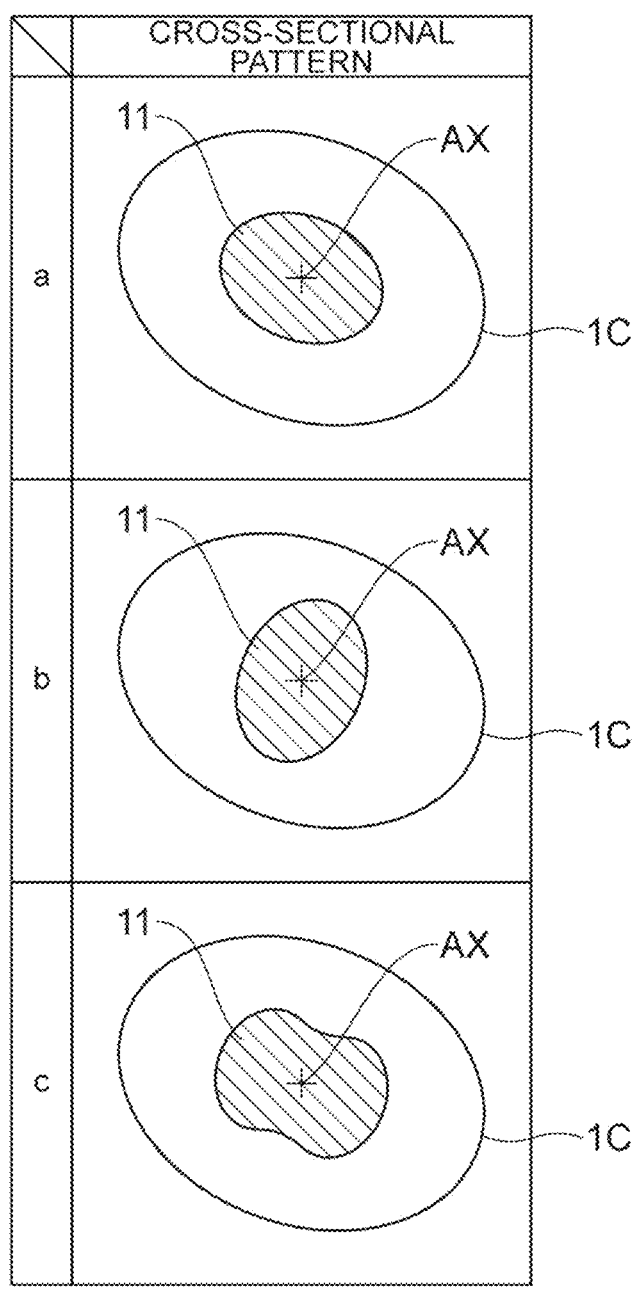
FIG. 4 is a diagram illustrating various cross-sectional patterns of a second intermediate glass rod 1C after a collapsing step (step ST30).

Representative cross-sectional patterns of a cross section of the second intermediate glass rod 1C obtained through the collapsing step (step ST30) (cross section perpendicular to longitudinal direction of second intermediate glass rod 1C, and referred to "rod cross section" below) are illustrated in FIG. 4. An outer peripheral shape of a rod cross section of the element-doped region 11 formed in the second intermediate glass rod 1C through the collapsing step usually has a non-circular shape, and empirically, the outer peripheral shape is an elliptical shape that can be approximated in general, for example, a cross-sectional pattern a and a cross-sectional pattern b in FIG. 4. The cross-sectional pattern a is an example in which the long axis direction of the outer peripheral shape of the second intermediate glass rod 1C substantially coincides with the long axis direction of the element-doped region 11 on the rod cross section, and the cross-sectional pattern b is an example in which the long axis direction of the outer peripheral shape of the second intermediate glass rod 1C is substantially perpendicular to the long axis direction of the element-doped region 11 on the rod cross section. In addition, as the cross-sectional pattern of the second intermediate glass rod 1C, an example has been confirmed in which the element-doped region 11 has an outer peripheral shape extending along the long axis direction and compressed along a short axis direction as in a cross-sectional pattern c in FIG. 4.

Since the outer peripheral portion of the second intermediate glass rod 1C heated by the oxyhydrogen burners 21 and 31 usually contains much moisture, the outer peripheral portion is removed by the grinding step. For example, in a case where the grinding step (step ST50) is performed on the second intermediate glass rod 1C having various cross-sectional patterns illustrated in FIG. 4, the obtained rod cross section of the center glass rod 10 has a grinding pattern illustrated in FIG. 5. Here, in the grinding step (step ST50), as illustrated in FIG. 3 (column having step number ST50), while the second intermediate glass rod 1C is rotated (may be rotation in one direction) in the direction indicated by the arrow S1 around the longitudinal direction coincident with the center axis AX, a blade 51 is moved in a direction indicated by an arrow S3. The outer peripheral portion of the second intermediate glass rod 1C is removed by such a movement of the blade 51, and the center glass rod 10 having a substantially circular rod cross section is obtained.

Figure 5:
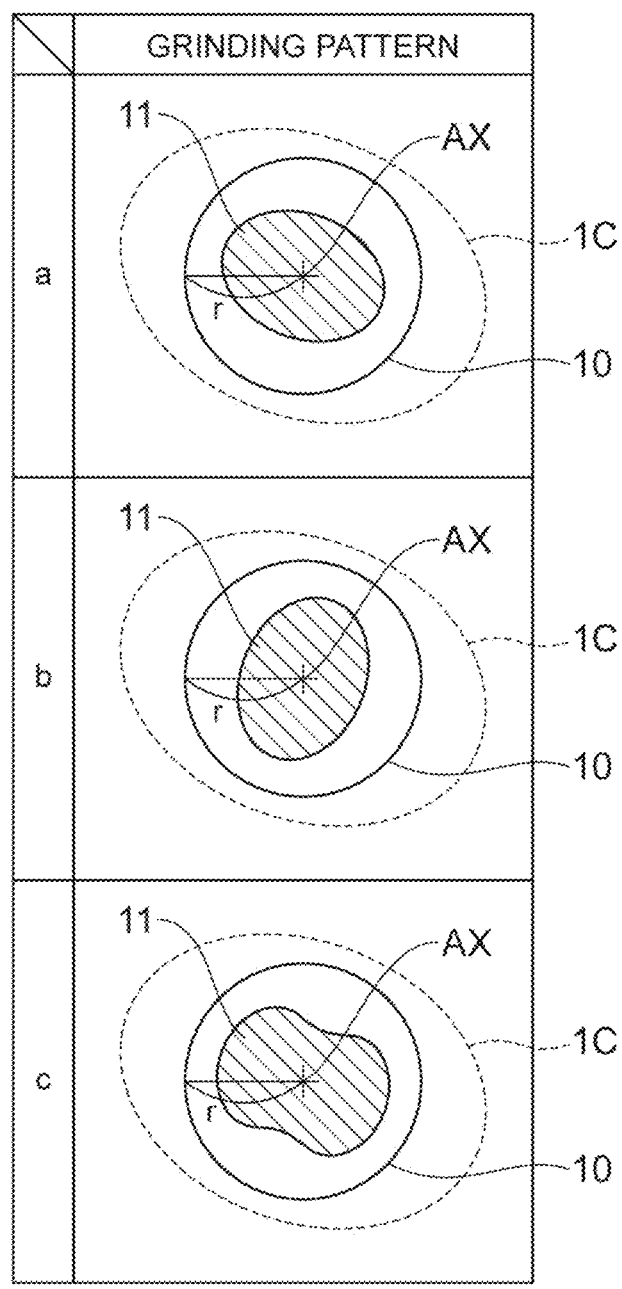
FIG. 5 is a diagram illustrating various grinding patterns to obtain the center glass rod 10 from the second intermediate glass rod 1C illustrated in FIG. 4.
Figure 6:
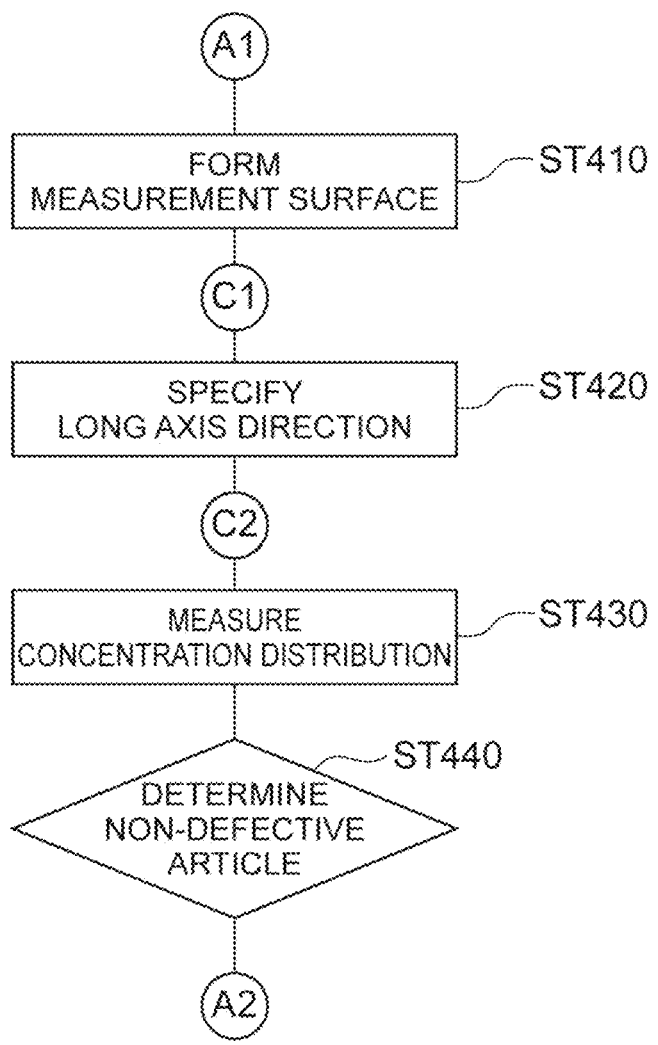
FIG. 6 is a flowchart for explaining a grinding preparation step (inspection step) of the optical fiber preform producing method according to the present embodiment.

Solid lines in FIG. 5 indicate the outer peripheral shape of the rod cross section and the grinding planned line of the center glass rod 10 obtained by the grinding step. That is, a grinding pattern a in FIG. 5 is an example in which a grinding planned line (defined by circumference of radius r around intersection with center axis AX on rod cross section) separated from the center of the rod cross section (position intersecting with center axis AX) by a distance r is set to the second intermediate glass rod 1C having the cross-sectional pattern a in FIG. 4, a grinding pattern b in FIG. 5 is an example in which a grinding planned line separated from the center of the rod cross section by the radius r is set to the second intermediate glass rod 1C having the cross-sectional pattern b in FIG. 4, and a grinding pattern c in FIG. 5 is an example in which a grinding planned line separated from the center of the rod cross section by the radius r is set to the second intermediate glass rod 1C having the cross-sectional pattern c in FIG. 4.

As can be seen from the grinding patterns a to c in FIG. 5, even in a case where the grinding planned line is set to be a substantially circular shape in the rod cross section, the outer peripheral shape of the element-doped region 11 of the second intermediate glass rod 1C obtained through the collapsing step remains to be a non-circular shape. Therefore, in the center glass rod 10 obtained through the grinding step (step ST50), a margin width between an outer periphery of the rod cross section (coincide with grinding planned line) and the element-doped region 11 fluctuates in a circumferential direction around the center axis AX. If the outer peripheral shape of the element-doped region 11 in the rod cross section is largely flattened, there is a possibility that a sufficient margin width cannot be secured between the element-doped region 11 and the grinding planned line. That is, in a case where the peripheral glass portion 20 having a different refractive index is further formed in the outer periphery of the center glass rod 10 in which the sufficient margin width cannot be secured, symmetry of the refractive index around the center axis AX in the rod cross section cannot be maintained. In other words, in the optical fiber obtained by drawing such an optical fiber preform, a possibility that designed optical characteristics cannot be obtained is increased.

Therefore, in the present embodiment, the inspection step (step ST40) is performed as a grinding preparation step between the collapsing step (step ST30) and the grinding step (step ST50). In this inspection step, in a case where the grinding step (step ST50) is performed, the second intermediate glass rod 1C that can be predicted to be able to secure the sufficient margin is selected as a non-defective article. The margin width (criterion value) to be secured may be appropriately set in consideration of a shape of designed refractive index profile and the like.

The inspection step (step ST40) is performed according to the flowchart illustrated in FIG. 6. Furthermore, in FIG. 3, a state of the preform in step ST410 is illustrated. In the inspection step (step ST40), first, the measurement surface is formed with respect to the second intermediate glass rod 1C obtained through the collapsing step (step ST30) (step ST410). That is, as illustrated in FIG. 3 (column having step number ST410), a measurement surface 41 corresponding to the cross section of the second intermediate glass rod 1C is formed as a measurement surface forming step, that is, an inspection first step. More specifically, by cutting a part of the second intermediate glass rod 1C from a direction perpendicular to the longitudinal direction at a position indicated by an arrow C, the exposed cross section of the second intermediate glass rod 1C is set as the measurement surface 41. Subsequently, as an inspection second step, the long axis direction of the element-doped region 11 on the measurement surface 41 is specified (step ST420). When the long axis direction of the element-doped region 11 is specified in the inspection second step, concentration distribution of the doped element along the specified long axis direction is measured in an inspection third step (step ST430). The concentration distribution of the doped element on the measurement surface 41 can be measured by using an electronic probe microanalyzer (EPMA). Then, in an inspection fourth step, an edge position of the element-doped region 11 is specified from the measurement result of the concentration distribution of the doped element along the long axis direction of the element-doped region 11. Since the grinding planned line (line coincident with outer periphery of cross section of center glass rod 10 that is finally obtained) defined by a circle having a radius r from the center (intersection with center axis AX) on the measurement surface 41 is set in advance, a shortest margin width (distance information) between the grinding planned line and the element-doped region 11 is calculated. If the calculated shortest margin width is too small, this results that the optical characteristics of the optical fiber obtained by drawing the optical fiber preform 100 including the center glass rod 10 is largely different from a designed value. Therefore, in the inspection fourth step, the second intermediate glass rod 1C that may be a grinding target in the grinding step (step ST50), that is, the second intermediate glass rod 1C of which the calculated shortest margin width exceeds a reference value that has been set in advance is selected as a non-defective article (step ST440).

Figure 7:
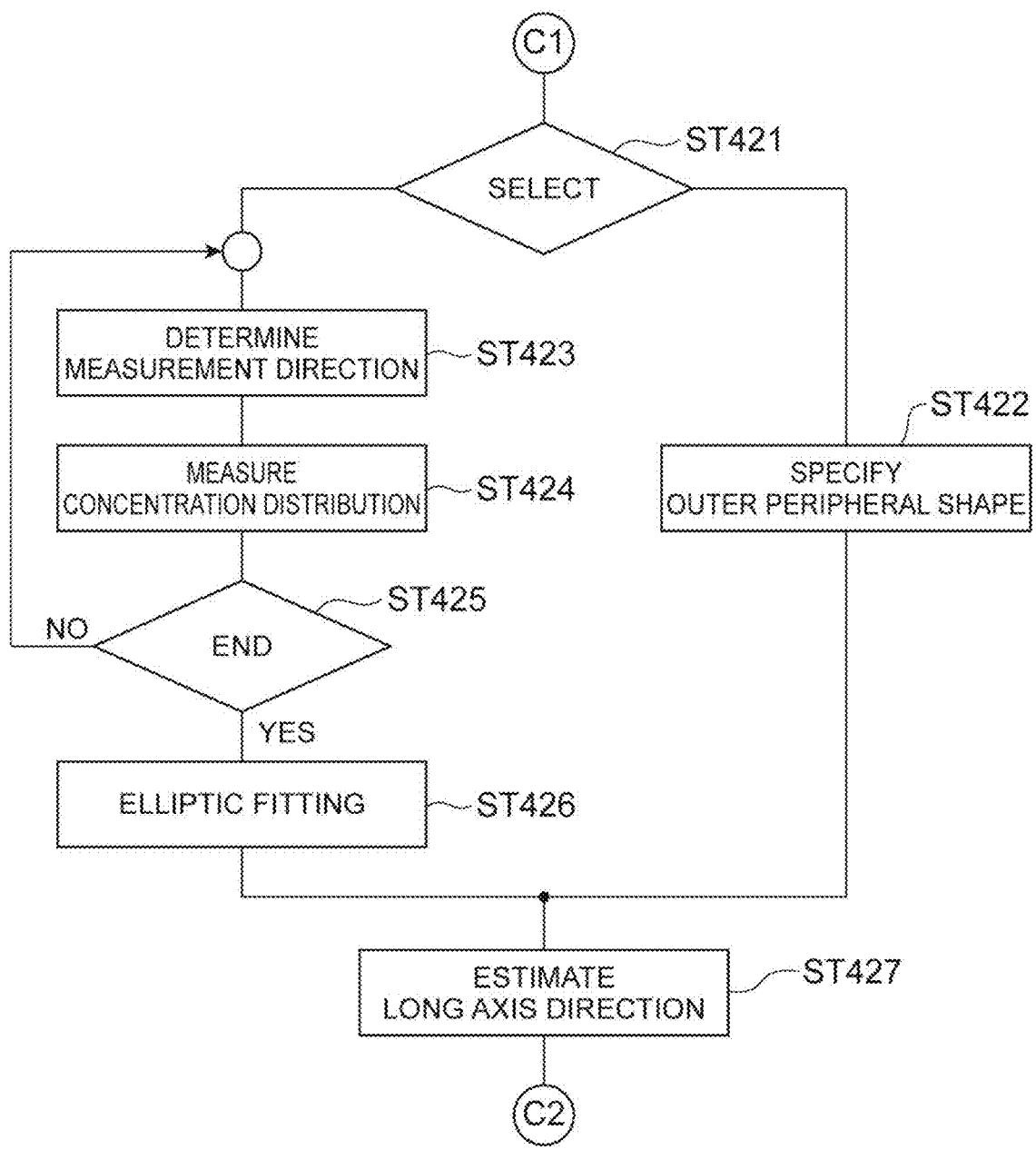
FIG. 7 is a flowchart for explaining a specific operation in a long axis direction in the grinding preparation step.

Here, in the inspection second step (step ST420), the long axis direction of the element-doped region 11 on the measurement surface 41 is specified based on the elliptic fitting (approximation of outer peripheral shape of element-doped region 11) or the outer peripheral shape of the measurement surface of the second intermediate glass rod 1C, for example, as illustrated in FIG. 7.

In a case where the outer periphery of the cross section (outer periphery of measurement surface 41) of the second intermediate glass rod 1C obtained through the collapsing step (step ST30) is flattened, empirically, it is found that an angle formed by the long axis direction of the element-doped region 11 and the long axis direction of the outer periphery of the cross section tends to be small (cross-sectional pattern a in FIG. 4). Therefore, in a case where a flattening ratio of the second intermediate glass rod 1C is relatively small (step ST421), in the inspection step, after the outer peripheral shape of the measurement surface 41 has been specified (step ST422), the specified long axis direction of the outer peripheral shape is estimated as the long axis direction of the element-doped region 11 (step ST427).

Figure 8:
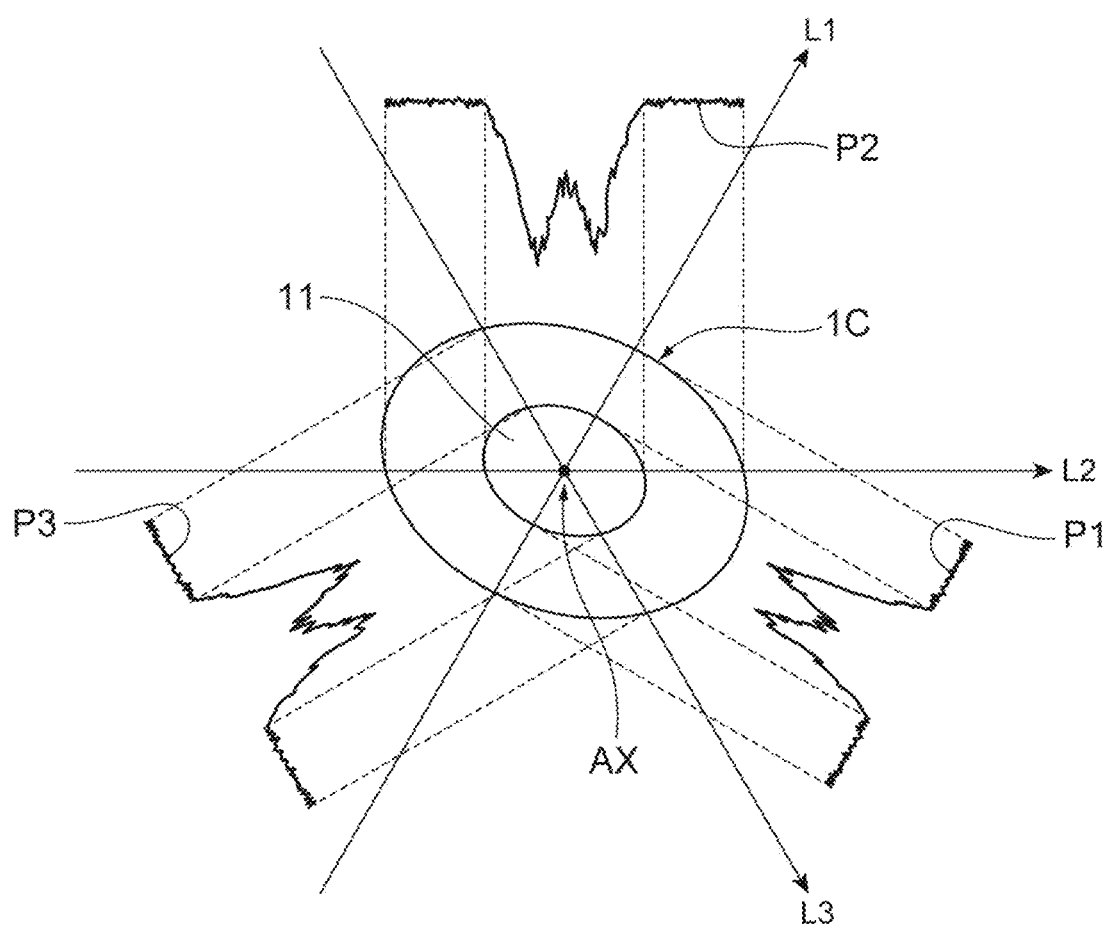
FIG. 8 is a diagram for explaining an example of the specific operation in the long axis direction in the grinding preparation step.

On the other hand, in a case where the longitudinal direction of the element-doped region 11 is precisely estimated, the long axis direction is specified by the elliptic fitting (step ST421). In the elliptic fitting, as illustrated in FIG. 8, a measurement direction L1 passing through the center (intersection with center axis AX) on the measurement surface is determined on the measurement surface 41

(step ST423). Subsequently, by using the electronic probe microanalyzer, concentration distribution P1 of the doped element is measured along the measurement direction L1 (step ST424). In the example in FIG. 8, concentration distributions P1 to P3 of the doped element are measured respectively for measurement directions L1 to L3 (step ST425). Since the edge position in each measurement direction of the element-doped region 11 on the measurement surface 41 can be specified from the concentration distributions P1 to P3 obtained by steps ST423 to ST425, the elliptic fitting is performed by using information on the obtained edge position (step ST426). In the elliptic fitting, the long axis direction of the approximated elliptical shape is estimated as the long axis direction of the element-doped region 11 (step ST427).

Figure 9:
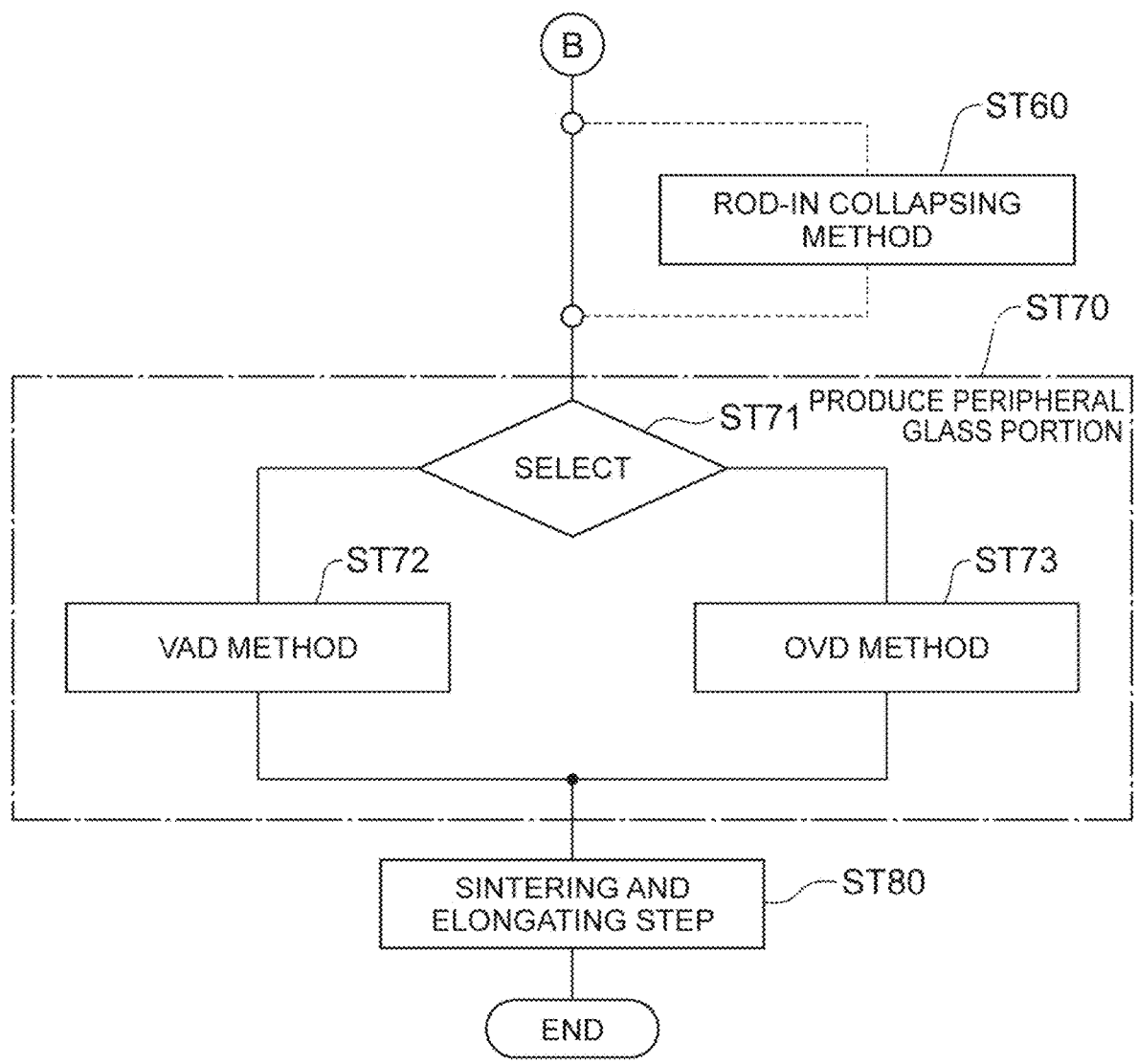
FIG. 9 is a flowchart for explaining a producing step of a peripheral glass portion (preform outer peripheral portion) 20 in the optical fiber preform producing method according to the present embodiment.

The outer peripheral portion of the second intermediate glass rod 1C determined as a non-defective article through the inspection step (step ST40) described above is removed in the grinding step (step ST50), and the center glass rod 10 is obtained. In the optical fiber preform producing method according to the present embodiment, a peripheral glass portion (preform outer peripheral portion) is produced on the outer peripheral surface of the center glass rod 10 produced in this way. FIG. 9 is a flowchart for explaining a producing step of the peripheral glass portion 20 in the optical fiber preform producing method according to the present embodiment. Furthermore, FIG. 10 is a diagram of states of the preform in steps ST60, ST72, and ST73 illustrated in flowchart in FIG. 9 in order to explain a state change on the preforms between the steps as comparing the states with each other.

In a case where the center glass rod 10 is a portion corresponding to a core center portion of the optical fiber, for example, a rod-in collapsing method (step ST60) may be performed. In this case, as illustrated in FIG. 10 (column having step number ST60), in a state where the center glass rod 10 is housed in the hollow glass rod 61 (glass pipe having refractive index different from refractive index of center glass rod 10) along a direction indicated by an arrow S4, the center glass rod 10 and the hollow glass rod 61 are integrated.

Next, an outer peripheral portion producing step for producing the peripheral glass portion (preform outer peripheral portion) 20 is performed on the outer peripheral surface of the center glass rod 10 or the hollow glass rod 61 integrated with the center glass rod 10 (step ST70). In the outer peripheral portion producing step, the peripheral glass portion 20 is produced by a Vapor-phase Axial Deposition (VAD) method (step ST72) or an Outside Vapor Deposition (OVD) method (step ST73).

That is, in a case where the VAD method is selected as the producing method of the peripheral glass portion 20 (step ST72), as illustrated in FIG. 10 (column having step number ST72), the center glass rod 10 is rotated in a direction indicated by an arrow S5. At that time, a flame of a burner 71 to which fuel gas and raw material gas are supplied is blown to the outer peripheral surface of the center glass rod 10. As a result, glass particles are deposited on the outer peripheral surface. On the other hand, in a case where the OVD method is selected as the producing method of the peripheral glass portion 20 (step ST73), as illustrated in FIG. 10 (column having step number ST73), the center glass rod 10 is rotated in the direction indicated by the arrow S5. At that time, as moving along the longitudinal direction of the center glass rod 10, the flame of the burner 71 to which fuel gas and raw material gas are supplied is blown to the outer peripheral surface of the center glass rod 10. As a result, glass particles are deposited on the outer peripheral surface.

The glass layer deposited on the outer peripheral surface of the center glass rod 10 through the producing step of the peripheral glass portion (step ST70) is sintered by being heated by a heating furnace (forming as transparent glass). After that, the glass layer is further elongated to have a predetermined outer diameter so as to obtain the optical fiber preform 100 (step ST80). Note that, various modifications, limited to the above aspects, can be applied to the producing method according to the present embodiment. The producing method can be applied to a method for measuring the concentration distribution of a dopant, for example, in a case where the collapse is performed after the glass layer is formed on an inner surface of a pipe having a non-circular cross section such as a pipe of which a cross section has a polygonal shape such as a rectangular shape or which is partially polished, in a case where the element-doped region has a large non-circular shape, or in a case where the cross section of the preform is intentionally formed into a non-circular shape.

REFERENCE SIGNS LIST

1A . . . hollow glass rod (glass pipe); 1B . . . first intermediate glass rod; 1C . . . second intermediate glass rod; 10 . . . center glass rod; 11 . . . element-doped region; 20 . . . peripheral glass portion; and 100 . . . optical fiber preform.

The invention claimed is:

1. An optical fiber preform producing method for producing an optical fiber preform which has a center glass rod that extends along a predetermined center axis and a peripheral glass portion provided on an outer peripheral surface of the center glass rod, wherein a producing step of the center glass rod comprises:

a glass layer forming step of producing a first intermediate glass rod by forming a glass layer including a predetermined element on an inner peripheral surface of a hollow glass rod extending along the center axis;

a collapsing step of producing a second intermediate glass rod, in which an element-doped region including the predetermined element is formed along the center axis, by collapsing the first intermediate glass rod;

an inspection step of selecting a non-defective article of the second intermediate glass rod by using a measurement result of concentration distribution measured on a cross section of the second intermediate glass rod perpendicular to the center axis, that is concentration distribution of the predetermined element along a long axis direction of the element-doped region; and a grinding step of producing the center glass rod by grinding an outer peripheral portion surrounding the center axis of the second intermediate glass rod selected in the inspection step along a grinding planned line defined by a predetermined radius around the center axis, and the inspection step includes:

an inspection first step of forming a measurement surface corresponding to the cross section with respect to the second intermediate glass rod;

an inspection second step of specifying the long axis direction of the element-doped region on the measurement surface;

an inspection third step of measuring the concentration distribution of the predetermined element in the element-doped region along the specified long axis direction; and an inspection fourth step of selecting the second intermediate glass rod to be a grinding target in the grinding step as the non-defective article by using distance information between the grinding planned line and the element-doped region, along the long axis direction of the element-doped region, calculated from the measurement result of the concentration distribution of the predetermined element.

2. The optical fiber preform producing method according to claim 1, wherein the inspection second step includes:

a concentration measuring step of measuring the concentration distribution of the predetermined element along each of a plurality of straight lines passing through a position intersecting with the center axis on the measurement surface;

a shape approximation step of approximating an outer peripheral shape of the element-doped region on the measurement surface by elliptic fitting using information regarding the concentration distribution of the predetermined element along each of the plurality of straight lines obtained by the concentration measuring step; and an axis specifying step of specifying a long axis direction of the outer peripheral shape obtained by the shape approximation step as the long axis direction of the element-doped region.

3. The optical fiber preform producing method according to claim 1, wherein the inspection second step includes an axis specifying step for specifying a long axis direction of an outer peripheral shape of the measurement surface as the long axis direction of the element-doped region.

* * * * *